(12) United States Patent
Buchmueller et al.

(10) Patent No.: US 9,688,404 B1
(45) Date of Patent: Jun. 27, 2017

(54) STABILIZED AIRBORNE DROP DELIVERY

(71) Applicant: Amazon Technologies, Inc., Seattle, WA (US)

(72) Inventors: Daniel Buchmueller, Seattle, WA (US); Louis LeRoi LeGrand, III, Seattle, WA (US); Jack Erdozain, Jr., Homestead, FL (US); Scarlett Elizabeth Koller, Cambridge, MA (US); Eric Alexander Riehl, Miami, FL (US); Trevor Barr Walker, Boston, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 62 days.

(21) Appl. No.: 14/558,046

(22) Filed: Dec. 2, 2014

(51) Int. Cl.
*B64D 1/12* (2006.01)
*B64C 39/02* (2006.01)
*B64C 15/14* (2006.01)
*G05D 1/00* (2006.01)

(52) U.S. Cl.
CPC .............. *B64D 1/12* (2013.01); *B64C 15/14* (2013.01); *B64C 39/024* (2013.01); *G05D 1/00* (2013.01); *B64C 2201/128* (2013.01); *B64C 2201/14* (2013.01)

(58) Field of Classification Search
CPC .................................... G05D 1/00; B64D 1/12
USPC ................................................. 294/66.2, 907
See application file for complete search history.

(56) References Cited

U.S. PATENT DOCUMENTS

| | | | |
|---|---|---|---|
| 3,223,358 A | | 12/1965 | Quick |
| 3,227,398 A | * | 1/1966 | Struble, Jr. ............... B64B 1/40 114/243 |
| 3,510,107 A | * | 5/1970 | Fidler ...................... B64D 1/22 244/137.4 |
| 3,838,836 A | | 10/1974 | Asseo et al. |
| 3,904,156 A | | 9/1975 | Smith |
| 5,190,250 A | | 3/1993 | DeLong et al. |
| H002163 H | * | 8/2006 | Mulhern ..................... 294/66.2 |
| 9,321,531 B1 | | 4/2016 | Takayama et al. |
| 9,422,139 B1 | | 8/2016 | Bialkowski et al. |
| 2007/0200032 A1 | | 8/2007 | Eadie et al. |

(Continued)

OTHER PUBLICATIONS

U.S. Appl. No. 14/671,343, filed Mar. 27, 2015, Non-Final Office Action mailed on Sep. 28, 2016.

*Primary Examiner* — Medhat Badawi
*Assistant Examiner* — Vicente Rodriguez
(74) *Attorney, Agent, or Firm* — Thomas | Horstemeyer LLP; Michael J. D'Aurelio; Jason M. Perilla

(57) ABSTRACT

Stabilized airborne drop delivery using an Unmanned Aerial Vehicle (UAV) is described. In one embodiment, the UAV includes a flight controller configured to control a flight path of the UAV, a winch mechanism secured to an underside of the UAV, a platform tethered to and extendable from the winch mechanism, and a ballast system configured to stabilize the platform. The winch mechanism may be relied upon to drop an item for delivery without landing the UAV. Because the use of the winch mechanism may give rise to certain design and operating considerations, various active and passive flight and/or ballast control systems are described. These systems are configured to maintain an orientation of the UAV, the platform, and/or the item during one or more stages of airborne drop delivery.

20 Claims, 10 Drawing Sheets

(56) References Cited

U.S. PATENT DOCUMENTS

| | | | |
|---|---|---|---|
| 2010/0038477 A1* | 2/2010 | Kutzmann | B64C 39/024 244/1 TD |
| 2011/0079678 A1 | 4/2011 | Brenner et al. | |
| 2012/0030974 A1 | 2/2012 | Runggaldier | |
| 2012/0168397 A1 | 7/2012 | Lim et al. | |
| 2013/0112643 A1 | 5/2013 | Lecours et al. | |
| 2015/0158587 A1* | 6/2015 | Patrick | B64C 39/024 244/137.4 |
| 2015/0331427 A1 | 11/2015 | Chaudary | |
| 2016/0083115 A1 | 3/2016 | Hess | |

* cited by examiner

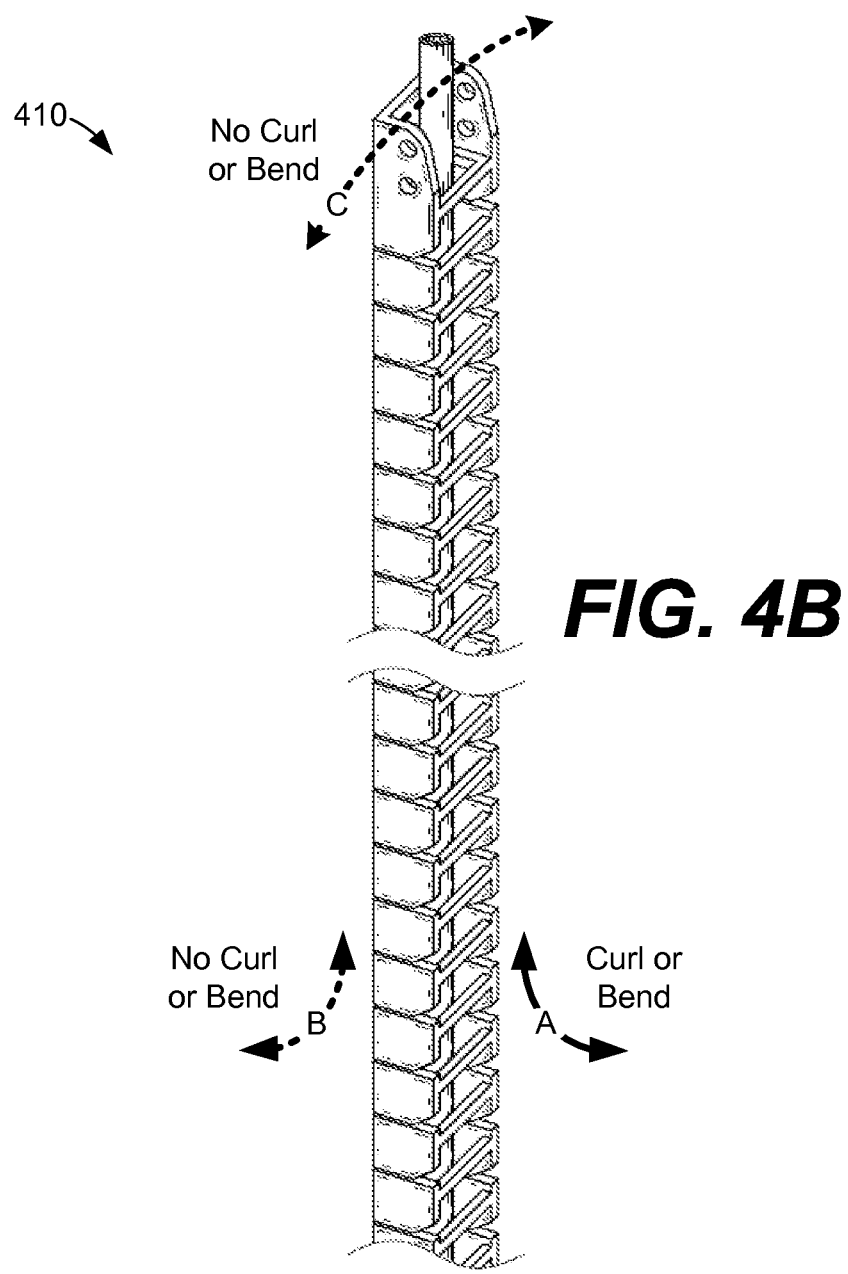

STABILIZED AIRBORNE DROP DELIVERY

BACKGROUND

The delivery of items typically includes picking and packaging the items, providing the packaged items to a carrier for delivery, and delivering the items. Even for small items or small numbers of items, boxes or other packages are transported by relatively large vehicles over roads, sometimes across long distances.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

FIG. 4B illustrates an example drag chain tether of a stabilized drop delivery UAV according to one embodiment of the present disclosure.

DETAILED DESCRIPTION

Figure 1:
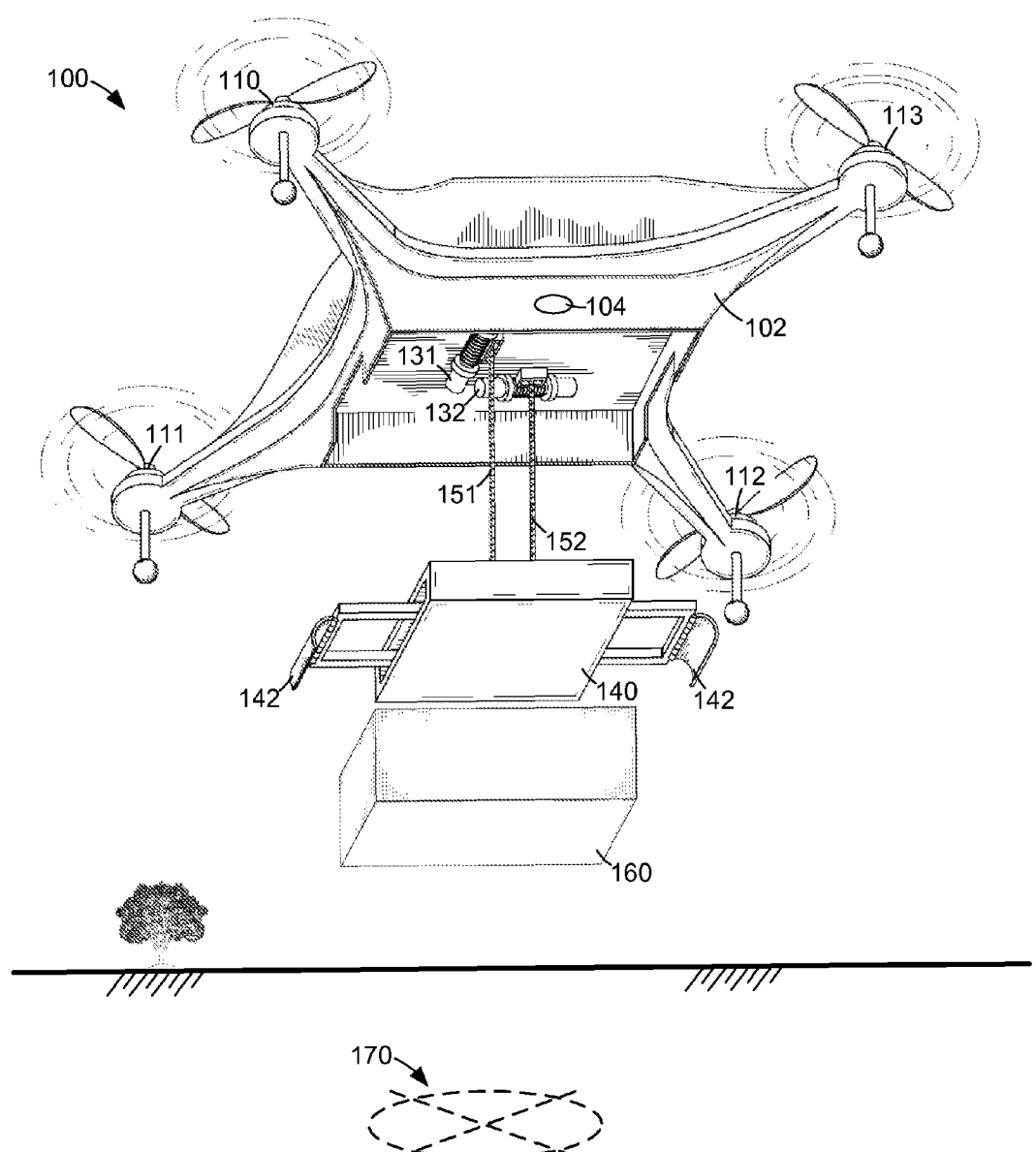
FIG. 1 illustrates a perspective view of an example stabilized drop delivery unmanned aerial vehicle (UAV) according to one embodiment of the present disclosure.

Embodiments of a stabilized drop delivery unmanned aerial vehicle (UAV) are described. For additional context in this regard, FIG. 1 illustrates a perspective view of an example stabilized drop delivery UAV 100 according to one embodiment. The UAV 100 includes a frame body housing 102 having arms that support motors 110-113 with attached propellers that provide thrust for flight. A camera 104 is provided on an exterior of the frame body housing 102. The camera 104 may include an image sensor and be relied upon for monitoring the height of the UAV 100, navigating the UAV 100, or for other purposes described herein. The UAV 100 also includes winches 131 and 132 and a platform 140 having clamp hooks 142. As illustrated, the platform 140 is tethered to the craft 100 by way of the tethers 151 and 152 which may be extended down from the winches 131 and 132. As such, the winches 131 and 132 may be relied upon to raise or lower the platform 140 with respect to the UAV 100 by winding or unwinding the tethers 151 and 152.

In operation, the UAV 100 may be used to provide airborne delivery of items, packages, parcels, etc. That is, after an item 160, for example, is secured to the platform 140 using the clamp hooks 142, the UAV 100 may travel by flight to a delivery zone 170. While travelling, the platform 140 and the item 160 may be raised and maintained in a retracted position by the winches 131 and 132. When the UAV 100 is suitably positioned above the delivery zone 170, the platform 140 may be lowered from the UAV 100 by the winches 131 and 132 and the clamp hooks 142 released to drop the item 160 to the delivery zone 170.

Rather than landing the UAV 100 directly at the delivery zone 170 before releasing the item 160, various advantages may be realized by using the winches 131 and 132 to lower the platform 140 toward the landing surface at the delivery zone 170 before releasing the item 160. For example, it may be more energy efficient to maintain the UAV 100 at a minimum height above the landing surface when delivering the item 160, rather than landing the UAV 100 upon the landing surface. Further, it may be safer for the UAV 100 and/or individuals to maintain the UAV 100 at a minimum height above the landing surface when delivering the item 160. Similarly, by using the winches 131 and 132 to lower the platform 140, the item 160 may be picked up for delivery without landing the UAV 100.

The use of the winches 131 and 132 to lower the platform 140 from the UAV 100 gives rise to certain design and operating considerations, such as the potential for flight instability for the UAV 100, the potential for an inaccurate drop of the item 160, the potential for undesirable sway in the platform 140, the need to detect the height of the UAV 100, the platform 140, and/or the item 160 while lowering the platform 140, etc. In view of these and other considerations, various active and passive flight and/or ballast control systems are described herein. These systems are configured to maintain an orientation of the UAV 100, the platform 140, and/or the item 160 during one or more stages of airborne delivery. Further, various types of winch, attachment, and release mechanisms that lower and release one or more items, such as the item 160, are described.

Figure 2:
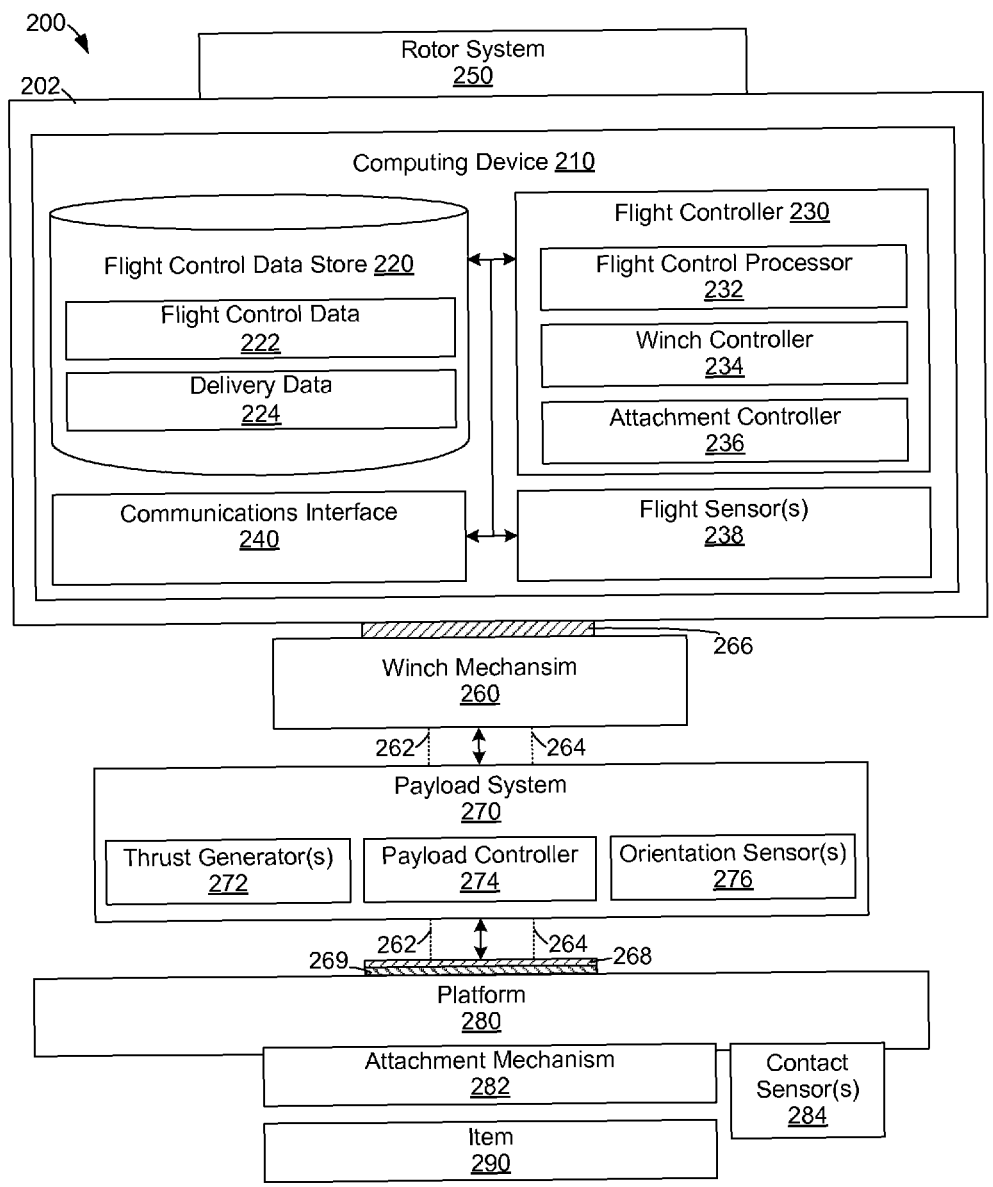
FIG. 2 illustrates an example block diagram of components of a stabilized drop delivery UAV similar to that provided in FIG. 1 according to one embodiment of the present disclosure.

Before turning to FIG. 2, it is noted that the UAV 100 in FIG. 1 is provided as a representative example only, is not drawn to scale, and is not intended to be limiting with regard to the type, structure, or scope of the embodiments described herein. Similarly, in FIG. 1, the manner in which the platform 140 is tethered to the frame body housing 102 of the UAV 100 is provided as a representative example, and alternative types and arrangements of tethers are described below.

FIG. 2 illustrates an example block diagram of components of a stabilized drop delivery UAV 200 similar to that provided in FIG. 1. The UAV 100 in FIG. 1 may be considered a more particular embodiment of the UAV 200 in FIG. 2. Generally, the UAV 200 may be relied upon to deliver the item 290 as further described below. The UAV 200 includes a frame body housing 202, a computing device 210, a rotor system 250, a winch mechanism 260 secured to an underside of the UAV 200, a payload system 270, a platform 280 tethered to the winch mechanism 260, tension breakers 266 and 268, and a tension detector 269. Two representative tethers that extend from the winch mechanism 260 to the platform 280 are identified in FIG. 2 at reference numerals 262 and 264. The payload system 270 may be mounted to or integrated with the platform 280, and the platform 280 may include an attachment mechanism 282 that releasably secures the item 290 to the platform 280.

It is noted that the block diagram of the components of the UAV 200 in FIG. 2 is not drawn to scale or to be limiting with regard to the structural connections or relative structural arrangements between them. Instead, the block diagram provides an outline of various components which may be relied upon in stabilized drop delivery UAVs, for discussion. Further, the block diagram of the components of the UAV 200 in FIG. 2 is not exhaustive. That is, the UAV 200 may include other components, such as one or more batteries, fuel tanks, communications and/or control systems, etc., which are omitted for the sake of focus. Finally, not every component in FIG. 2 is required in all embodiments. In other words, one or more components (e.g., the tension breakers 266 and 268, the payload system 270, etc.) illustrated in FIG. 2 may be omitted. The rotor system 250 may include one or more motors similar to the motors 110-113 in FIG. 1, engines, etc. with attached propellers that provide thrust for flight of the UAV 200. Among embodiments, any suitable type and number of motors, engines, etc. may be relied upon to provide thrust for flight, depending upon considerations such as the size of the UAV 200, the weight of the item 290, the distance the UAV 200 must travel for delivery of the item 290, etc. The rotor system 250 and, hence, the flight of the UAV 200 are controlled by the computing device 210 of the UAV 200, as described herein.

The computing device 210 may be embodied, at least in part, as one or more embedded or general-purpose processors, computers, processing devices, or computing devices having memory. The computing device 210 may also be embodied, in part, as various functional and/or logic (e.g., computer-readable instruction, code, device, circuit, processing circuit, etc.) elements executed or operated to perform aspects of the embodiments described herein. The computing device 210 may be mounted and secured within the frame body housing 202 of the UAV 200.

As illustrated in the example embodiment in FIG. 2, the computing device 210 includes a flight control data store 220, a flight controller 230, one or more flight sensors 238, and a communications interface 240. The communications interface 240 may include any suitable interface for communicating data, such as a cellular interface (e.g., Global System for Mobile communications ("GSM"), Code Division Multiple Access ("CDMA"), Local Multi-point Distribution Systems ("LMDS"), Long Term Evolution ("LTE"), Multi-channel-Multi-point Distribution System ("MMDS"), etc.), a Bluetooth interface, a Wireless Local Area Network ("WLAN") (e.g., 802.11-based) interface, or any combination thereof, among other communications interfaces.

The flight control data store 220 includes flight control data 222 and delivery data 224. The flight control data store 220 may include any data necessary to control the flight of the UAV 200, such as operations and/or control algorithms, flight reference data, etc. The delivery data 224 may include any data necessary for the delivery of one or more items, such as map or coordinate system data, address data, scheduling and/or delivery protocol data, etc.

The flight controller 230 includes a flight control processor 232, a winch controller 234, and an attachment controller 236. Generally, the flight control processor 232 is configured to control the flight and flight path of the UAV 200, control the winch mechanism 260, and control the attachment mechanism 282 of the platform 280. Additional aspects of the operation and configuration of the computing device 210 are described in further detail below.

The flight sensors 238 may include one or more micro- or nano-electromechanical system (NEMS or MEMS) or other type of accelerometer, gyroscope, or similar orientation sensor. The flight sensors 238 may also include one or more global positioning system ("GPS") sensors, height, altitude, or altimeter sensors, an ultrasonic sensor, a pressure sensor, and/or image, infrared, or thermal sensors (i.e., various types of cameras) (e.g., the camera 104 in FIG. 1), among others. The flight sensors 238 may provide geographic, navigation, and/or orientation signals to the flight controller 230.

In various embodiments, the winch mechanism 260 includes one or more winches that may be similar to the winches 131 and 132 in FIG. 1. Generally, each of the winches of the winch mechanism 260 may be embodied as a mechanical device that raises and lowers the platform 280 using an extendable tether. The winch mechanism 260 may also raise and lower the payload system 270 using an extendable tether. In this context, each of the winches of the winch mechanism 260 may include a spool or drum for winding an extendable tether and gear assemblies powered by an electric motor, such as a stepper or continuous servo motor, for example, for turning or rotating the spool to extend or retract the extendable tether. Among other means, the winches may be secured to the frame body housing 202 of the UAV 200 using any suitable attachment means, such as screws, bolts, clips, adhesives, or combinations thereof.

As illustrated in FIG. 2, the tension breaker 266 may be mechanically interposed between the winch mechanism 260 and the frame body housing 202 of the UAV 200. Similarly, the tension breaker 268 may be mechanically interposed between the platform 280 and the tethers 262 and 264. The tension breakers 266 and 268 may be embodied as any mechanical attachment structure that breaks or disconnects automatically under a predetermined amount of tension. In that context, the tension breakers 266 and 268 may be embodied as attachment structures (e.g., screws, buts, bolts, clips, etc.) of limited tensile strength. Thus, if an unexpected level of tension arises in one or both of the tethers 262 and 264, one or both of the tension breakers 266 and 268 may automatically break or disconnect.

In some embodiments, the tension breakers 266 and 268 may be controlled by the flight controller 230 to release or disconnect based on an amount of tension detected in one or both of the tethers 262 and 264 by the tension detector 269. In this case, the tension breakers 266 and 268 may be embodied as some type of exploding, fracturing, or pyrotechnic attachment structure that releases in response to a control signal from the flight controller 230. In this case, if an unexpected level of tension (e.g., greater than a predetermined amount) arises, the tension detector 269 may detect and provide a signal representative of that tension to the flight controller 230. In turn, the flight controller 230 may control one or both of the tension breakers 266 and 268 to disconnect. Once disconnected by the tension breakers 266 and 268, the winch mechanism 260 and/or the platform 280 may fall from the UAV 200. In this sense, the tension breakers 266 and 268 offer some protection against the platform 280 being unexpectedly pulled or caught in a tree, power line, etc.

In some embodiments, one or more dampeners, such as rubber dampeners, dashpots, etc., may be placed and secured between the winches of the winch mechanism 260 and the frame body housing 202 of the UAV 200. Similarly, one or more dampeners, such as rubber dampeners, dashpots, etc., may be placed and secured between the platform 280 and the tethers 262 and 264. Further, to help prevent any of the tethers from tangling in the winches of the winch mechanism 260, the tethers 262 and 264 may slide over a winding and/or tensioning surface or surfaces that tend to wrap the tethers evenly around the spools of the winches. For example, the tethers may pass through a pair of freely rotating wheels to tension the tethers. The tethers may be directed through a small opening to prevent tangles, where the small opening adds friction to tension and smoothly spools the tethers.

As further described below, the winch controller 234 of the computing device 210 may be configured to control or actuate the winch mechanism 260 to raise and lower the platform 280 and/or the payload system 270 at certain times and based on certain considerations. In various embodiments, the tethers 262 and 264 may be embodied as a flexible, semi-flexible, or rigid string, rope, wire, chain, drag chain, extension spring, or any other suitable type of tether or any combination thereof. In other embodiments, the tethers 262 and 264 may be pneumatic in nature and may be pumped with and/or stiffened by air. In this case, a pneumatic tether may be deflated while rolled up and inflated when unrolled and extended. An additional description of certain tethers is provided below with reference to FIGS. 4A, 4B, and 5.

The payload system 270 may include one or more thrust generators 272, a payload controller 274, and one or more orientation sensors 276. The payload controller 274 may be embodied as one or more embedded or general-purpose processors, computers, processing devices, or computing devices having memory. The payload controller 274 may also be embodied, in part, as various functional and/or logic (e.g., computer-readable instruction, code, device, circuit, processing circuit, etc.) elements executed or operated to perform aspects of the embodiments described herein. The payload controller 274 may be mounted and secured to the platform 280 and configured to stabilize the platform 280. More particularly, based on feedback from the orientation sensors 276, the payload controller 274 may be configured to control the thrust generators 272 in an effort to maintain an orientation of the platform 280 and/or the item 290, especially when the tethers 262 and 264 are extended by the winch mechanism 260 to lower the platform 280.

The thrust generators 272 may be embodied as one or more fans, engines, compressed gas thrusters, etc. Generally, the thrust generators 272 are controlled by the payload controller 274 to maintain an orientation of the platform 280, the item 290 attached to the platform 280, and the UAV 200. In one embodiment, several thrust generators 272 may be oriented in alternate directions to provide thrust in different directions, as necessary. The thrust may counter, balance, or ballast any tendency of the platform 280 to swing when lowered by the winch mechanism 260. The orientation sensors 276 may include one or more NEMS, MEMS, or other type of accelerometer, gyroscope, or similar orientation sensor. The orientation sensors 276 may also include one or more height or altitude sensors and/or image, infrared, or thermal sensors (i.e., various types of cameras). The orientation sensors 276 provide orientation signals to the payload controller 274. These orientation signals are representative of whether the platform 280 is swinging or tilting, for example. As noted above, based on this feedback from the orientation sensors 276, the payload controller 274 may be configured to control the thrust generators 272 in an effort to maintain an orientation of the platform 280 and/or the item 290 in a relatively flat (i.e., relatively perpendicular to the ground) orientation. In this context, the payload controller 274 is representative of a means for active stabilization or orientation for the UAV 200 and/or the platform 280.

In various embodiments, the control provided by the payload system 270 may operate in conjunction with or independently from the flight controller 230. That is, in one embodiment, the flight controller 230 may be configured to control the rotor system 250 but not the thrust generators 272. Even in this situation, it should also be appreciated that any undesirable sway that occurs in the platform 280 which is translated (i.e., passed on) to the remainder of the UAV 200 through the tethers 262 and 264 may be detected by and compensated for by the flight sensors 238 and the flight controller 230. In another embodiment, the payload controller 274 may be omitted and the flight controller 230 may be configured to control the thrust generators 272 based on feedback from the orientation sensors 276 and/or the flight sensors 238. In certain embodiments, the payload system 270 may be entirely omitted from the UAV 200. In still other embodiments, the flight controller 230 and the payload system 270 may share a control loop and feedback signals from the orientation sensors 276 and the flight sensors 238.

The embodiments described herein may additionally or alternatively rely on passive stabilization for the UAV 200 and/or the platform 280. Passive stabilization may be provided by relying upon a certain shape of packaging for the item 290 (e.g., shape of the packaging box). For example, cylindrical or teardrop-shaped packages may be preferred for the ability to deflect forces due to wind. Additionally or alternatively, a tail fin may be used with the packaging for the item 290. The tail fin may help orient the packaging in the wind for less resistance.

Passive stabilization may be provided to the platform 280 using a particular structure or arrangement of the tethers 262 and 264 and/or a particular structure or arrangement of winches in the winch mechanism 260. More particularly, the arrangement of the winches in the winch mechanism 260 and/or the tethers 262 and 264 may be selected so as to provide a relatively rigid means of extending the platform 280 down from the remainder of the UAV 200. For example, as described in further detail below, the extendable tethers 262 and 264 may be embodied as chains or drag chains that curl or spool in one direction but resist (or are rigid against) forces that push in other directions. In this case, if the winches in the winch mechanism 260 and, hence, the tethers 262 and 264 are mounted in certain orientations (e.g., perpendicular to each other), the extendable tethers 262 and 264 may remain relatively rigid while lowering the platform 280 from the remainder of the UAV 200. In this case, any undesirable sway that might occur or originates in the platform 280 will more readily be translated to the remainder of the UAV 200 and be detected by and compensated for by the flight sensors 238 and the flight controller 230. Thus, in this passive configuration, the flight controller 230 may be able to control the rotor system 250 to compensate for undesirable sway that occurs or originates in the platform 280, even while the platform 280 is being lowered down from the UAV 200.

The platform 280 may be embodied as any structure suitable for supporting the attachment mechanism 282 and/or the payload system 270. Also, the platform 280 may vary in size and shape, for example, depending upon the design of the UAV 200. The platform 280 may incorporate a contact sensor 284. The contact sensor 284 may be embodied as any type of sensor that detects contact with a landing surface. In this sense, the contact sensor 284 may be embodied as a switch that turns on or off depending upon whether the platform 280 and/or the item 290 is making contact with the landing surface.

The attachment mechanism 282 may be embodied as any suitable attachment mechanism or means for releasably securing the item 290 to the platform 280 and, hence, the UAV 200. The attachment mechanism 282 may be adjustable so as to secure various sizes of items, packages, parcels, etc. to the platform 280. In the UAV 200, the attachment controller 236 is configured to control the attachment mechanism 282 to secure and/or release the item 290 from the platform 280 based on various considerations and/or control inputs as described below.

In one embodiment, the attachment mechanism 282 may be embodied as a clamp, grip, claw, or hook, such as the clamp hooks 142 of the UAV 100 in FIG. 1. In other embodiments, the attachment mechanism 282 may be embodied using one or more magnets, electromagnets, electro-permanent magnets, solenoid latches, etc. If an electromagnet is relied upon as the attachment mechanism 282, the electromagnet may be powered or actuated to hold the item 290 to the platform 280. When power to the electromagnet is cut off, the electromagnet may be demagnetized and release the item 290 from the platform 280. If an electro-permanent magnet is relied upon, a permanent magnet may hold the item 290 to the platform 280. When power is provided to the electro-permanent magnet, current that flows through the electro-permanent magnet may demagnetize, oppose, or overcome the magnetization of the permanent magnet and release the item 290 from the platform 280. It should be appreciated that other attachment mechanisms are within the scope of the embodiments, including various combinations of the mechanisms described above.

Figure 3:
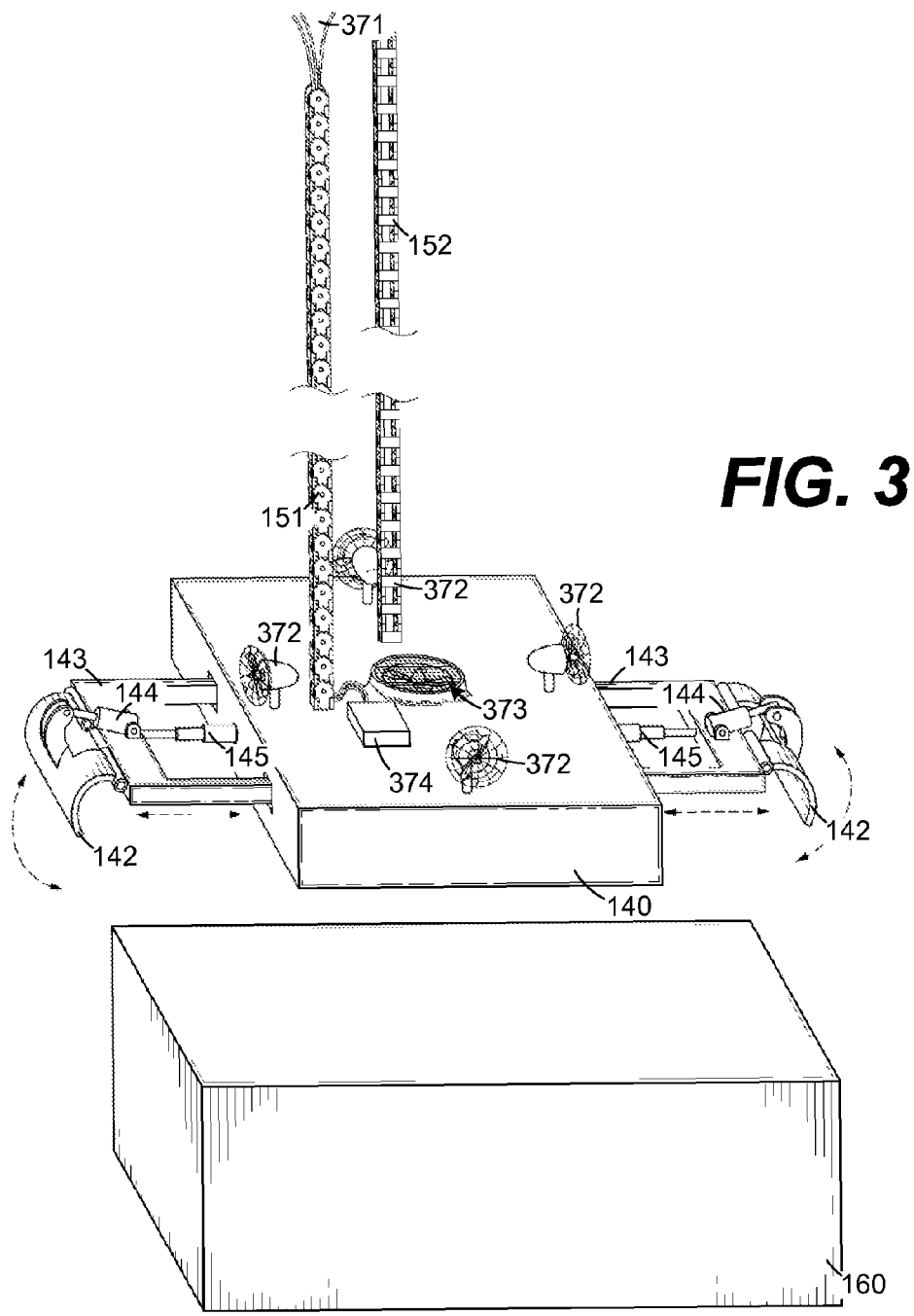
FIG. 3 illustrates a perspective view of an example platform of the stabilized drop delivery UAV in FIG. 1 according to one embodiment of the present disclosure.

FIG. 3 illustrates a perspective view of the platform 140 of the stabilized drop delivery UAV 100 in FIG. 1. In FIG. 3, the tethers 151 and 152 of the winches 131 and 132 (FIG. 1) are shown connected to the platform 140. Further, as an attachment mechanism, clamp arms 143, clamp hook actuators 144, and clamp arm extenders 145 are also illustrated along with the clamp hooks 142. Additionally, horizontal thrust generators 372 and a vertical thrust generator 373 are illustrated. A bundle of control and/or power wires 371 is routed through the tether 152 to the control box 374. The control box 374 may be used as an enclosure for control and/or sensor circuitry, such as for the payload controller 274 and/or the orientation sensors 276 described above with reference to FIG. 2. The illustration of the platform 140 and other components in FIG. 3 is provided as a representative example only, is not drawn to scale, and is not intended to be limiting with regard to the type, structure, or scope of the embodiments of stabilized drop delivery UAVs described herein.

In FIG. 3, the tethers 151 and 152 are drawn as chains, but it should be appreciated that other types of tethers may be relied upon. The tethers 151 and 152 may be of any suitable length depending upon how far the platform 140 is to be lowered from the UAV 100 and the ability for the winches 131 and 132 to spool up the length of the tethers 151 and 152.

When the platform 140 is lowered from the UAV 100 (FIG. 1) as illustrated in FIG. 3, the horizontal and vertical thrust generators 372 and 373 may be operated (e.g., turned on, turned off, accelerated, decelerated, etc.) to help stabilize the platform 140 in the presence of wind or during directional flight path changes, for example. Thus, in an effort to maintain a relatively horizontal orientation for the platform 140 and/or the item 160, a controller similar to the payload controller 274 in FIG. 2 may control the horizontal and vertical thrust generators 372 and 373 based on feedback from various sensors, such as any of the orientation sensors 276 described with reference to FIG. 2. More particularly, the payload controller 274 may power one or more of the horizontal thrust generators 372 on or off to counter, balance, or ballast any tendency of the platform 140 to swing. This control may involve turning on one or more of the horizontal thrust generators 372 that provides thrust in a direction opposite to or opposing the direction of wind or tilt of the platform 140. Additionally, the payload controller 274 may power on the vertical thrust generator 373 to provide vertical thrust that helps stabilize or ballast the platform 140 in a downward direction. It is noted that, in various embodiments, one or more of the horizontal or vertical thrust generators 372 and 373 may alternatively be embodied as a compressed gas thruster, projectile thruster, etc. Additionally, while horizontal 372 and vertical 373 thrust generators are shown and described with respect to embodiments disclosed herein, it should be understood by those having ordinary skill that thrust generators having combined vertical and horizontal thrust vectors may also be used.

Control circuitry, such as the attachment controller 236 in FIG. 1, may actuate one or both of the clamp hook actuators 144 or clamp arm extenders 145 to move the clamp hooks 142 and/or the clamp arms 143. In this way, the clamp hooks 142 may be adjusted to releasably secure the item 160 to the platform 140. The clamp hook actuators 144 and clamp arm extenders 145 in FIG. 3 are provided as one example means for adjustment of the clamp hooks 142 and/or the clamp arms 143. The clamp hook actuators 144, clamp arm extenders 145, clamp hook actuators 144, and clamp arm extenders 145 are not intended to be limiting with regard to the type, structure, or scope of attachment mechanisms encompassed by the embodiments.

In FIG. 3, the tethers 151 and 152 are shown as being mechanically connected or coupled to the platform 140 proximate to the center of the platform 140. However, in other embodiments, the tethers 151 and 152 may be mechanically connected or coupled to the platform 140 at other locations. Additionally, fewer or additional tethers similar to the tethers 151 and 152 may be relied upon in other embodiments. Other example arrangements of tethers are described below with reference to FIGS. 6A-E. The horizontal and vertical thrust generators 372 and 373 are shown in FIG. 3 as being mechanically connected or coupled to the platform 140 at the sides of the platform 140. However, in other embodiments, the thrust generators 372 and 373 may be placed at other locations. Additionally, in selected embodiments, a latching mechanism may secure platform 140 to UAV 100 while in transport mode such that the forces acting on item 160 carried therewith during flight are not carried by tethers 151 and 152.

Figure 4A:
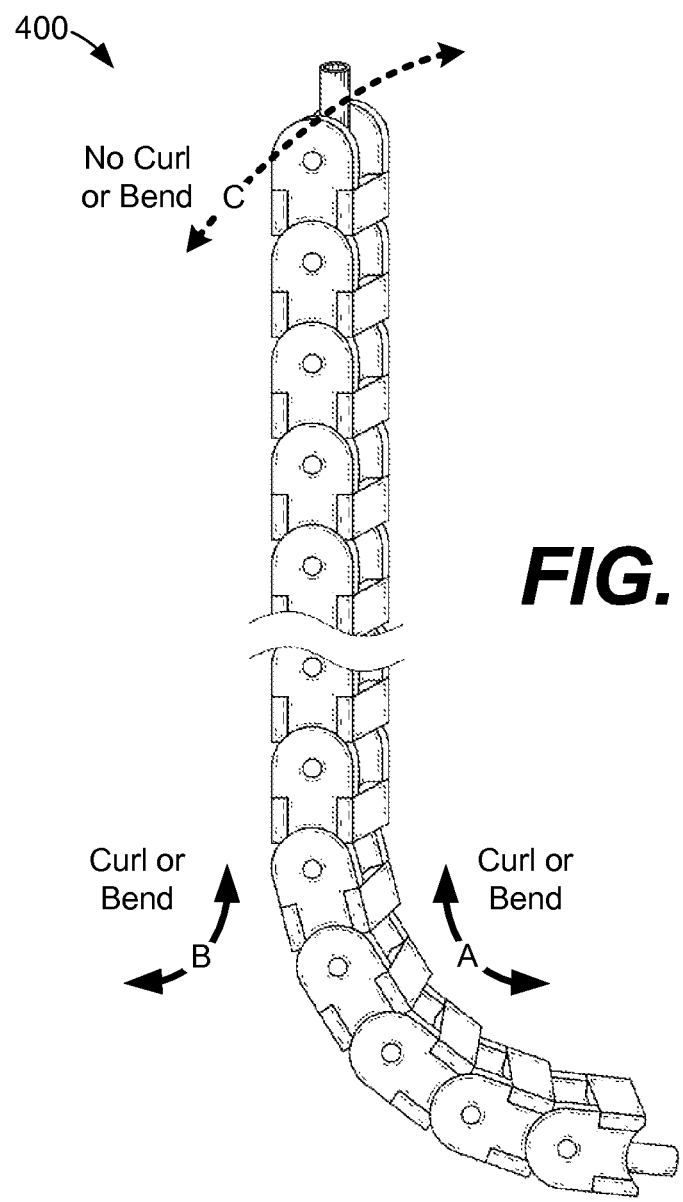
FIG. 4A illustrates an example chain tether of a stabilized drop delivery UAV according to one embodiment of the present disclosure.

FIG. 4A illustrates an example chain tether 400 which may be relied upon in the stabilized drop delivery UAV 100 in FIG. 1. The chain tether 400 is structured to permit curling, bending, or spooling at a winch in the directions "A" and "B". However, the chain tether 400 is also structured so as to substantially resist or prevent curling or bending in the direction "C". That is, the chain tether 400 resists or prevents curling or bending in the direction into the page. As described in further detail below with reference to FIG. 6A, when using two or more of the chain tethers 400 together as a group, the group may stay relatively rigid against forces from multiple directions while lowering a platform from a UAV.

FIG. 4B illustrates an example drag chain tether 410 which may be relied upon in the stabilized drop delivery UAV 100 in FIG. 1. Like chain 400, drag chain tether 410 is structured to permit curling, bending, or spooling at a winch in the direction "A" and resist curling or bending in direction "C". However, unlike chain 400, drag chain tether 410 is additionally structured so as to substantially resist or prevent curling or bending in the direction "B" as well. Again, when using two or more of the drag chain tethers 410 together as a group, the group may stay relatively rigid against forces from multiple directions while lowering a platform from a UAV.

Figure 5:
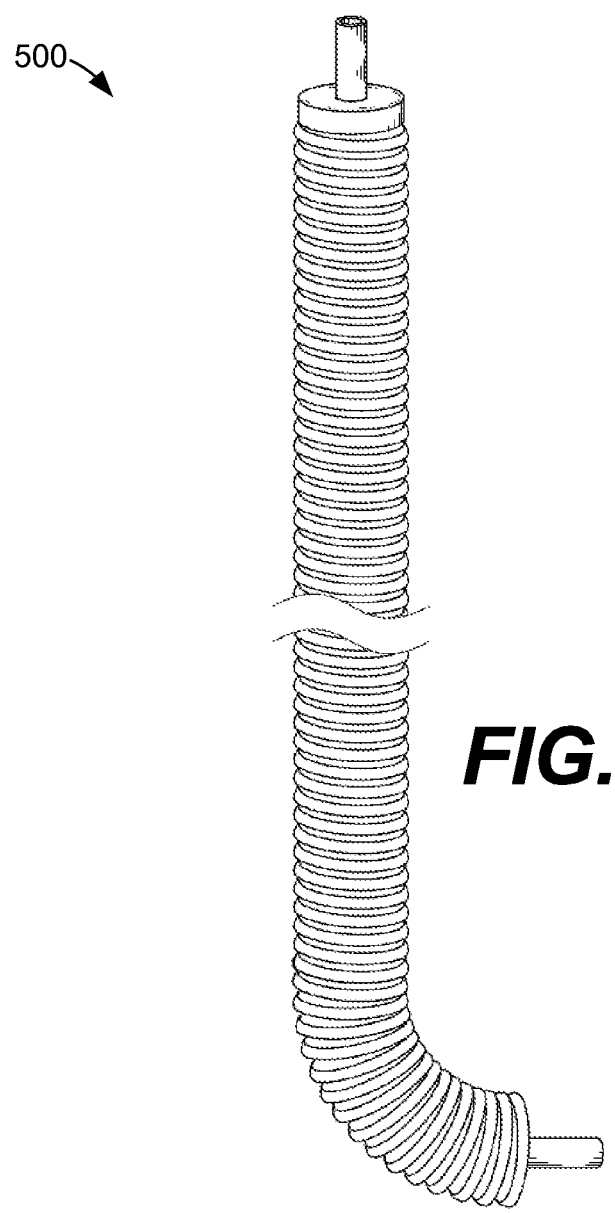
FIG. 5 illustrates an example extension spring tether of a stabilized drop delivery UAV according to one embodiment of the present disclosure.

FIG. 5 illustrates an example extension spring tether 500 which may be relied upon in the stabilized drop delivery UAV 100 in FIG. 1. The extension spring tether 500 may be embodied as a length of tightly curled wire. The extension spring tether 500 is structured to permit curling, bending, or spooling in any direction. However, the extension spring tether 500 provides some resistance to curling or bending in all directions. That is, the curled wire structure of the extension spring tether 500 seeks to spring or snap back to a relatively straight length. Thus, the extension spring tether 500 curls or bends in any direction but resists doing so. Using one, two, or more extension spring tethers 500, the group may remain relatively rigid against forces from multiple directions while lowering a platform from a UAV.

Figure 6A:
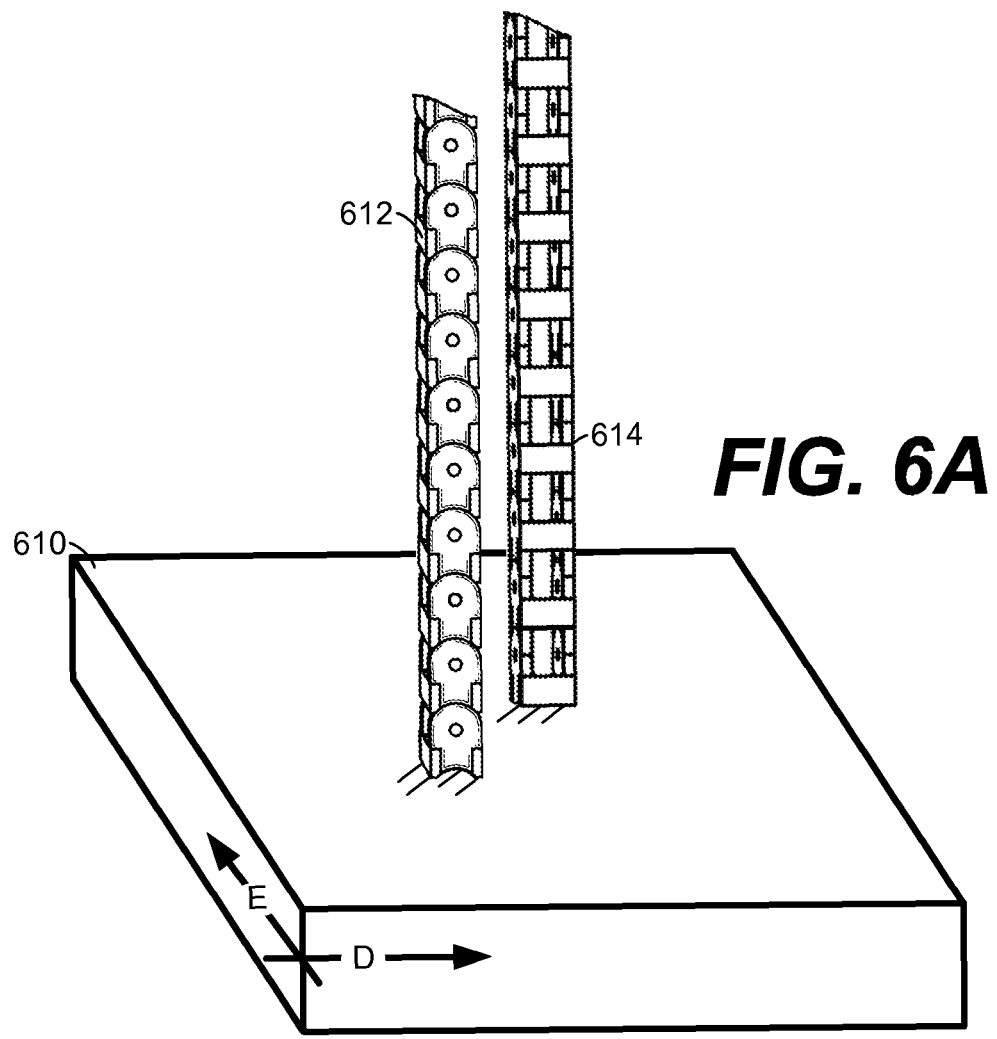
FIG. 6A illustrates a perspective view of an example arrangement of chain tethers secured to a platform of a stabilized drop delivery UAV according to one embodiment of the present disclosure.

FIG. 6A illustrates a perspective view of an example arrangement of tethers 612 and 614 secured to a platform 610 of a stabilized drop delivery UAV according to one embodiment of the present disclosure. The chain tethers 612 and 614 may be similar to either the chain tether 400 in FIG. 4A, the drag chain tether 410 in FIG. 4B, or a combination thereof. Each of the chain tethers 612 and 614 permits curling or bending in one or more directions and substantially resists bending in other directions. In the example provided in FIG. 6A, the drag chain tethers 612 and 614 are oriented perpendicular to each other and are mechanically connected or coupled to the platform 610 in such way. Thus, each of the drag chain tethers 612 and 614 flexes in one respective and different (e.g., opposite) direction as compared to each other. By way of this arrangement, forces on the platform 610 in the direction "D" due to wind or other movement, for example, may be opposed or resisted by the drag chain tether 614. Similarly, forces on the platform 610 in the direction "E" due to wind or other movement may be opposed or resisted by the drag chain tether 612. In this case, it should be appreciated that any forces upon the platform 610 in the directions "D" and "E" may be translated (i.e., passed on) to a corresponding UAV (e.g., the UAV 100 in FIG. 1) through the lengths of the drag chain tethers 612 and 614 themselves. In turn, to the extent that such forces impact the flight of the UAV, a flight controller of the UAV, such as the flight controller 230 in FIG. 2, may make corresponding adjustments to maintain the overall orientation of the UAV and the platform 610.

Figure 6B:
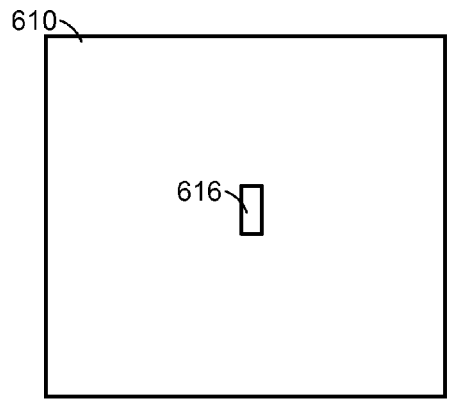
FIGS. 6B-E illustrate top-down views of other example arrangements of chain tethers secured to a platform of a stabilized drop delivery UAV according to embodiments of the present disclosure.
Figure 6C:
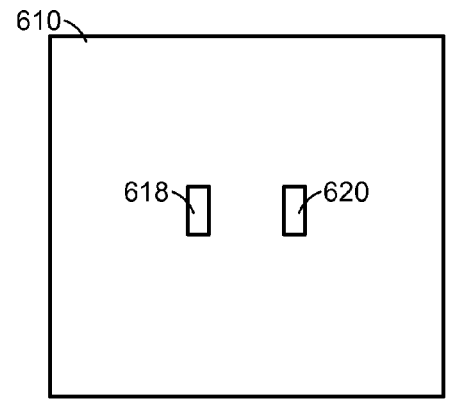
Figure 6D:
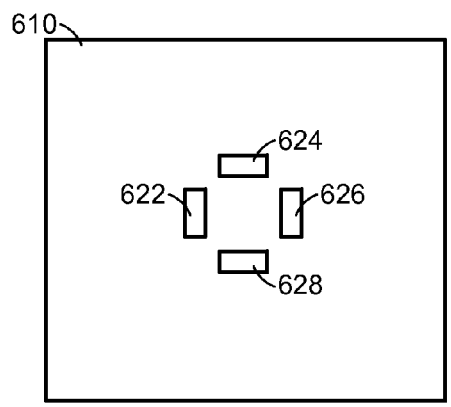
Figure 6E:
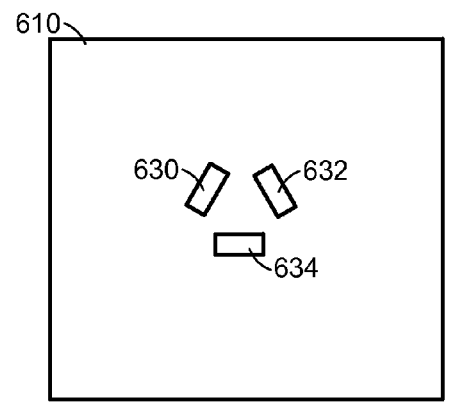

FIGS. 6B-E illustrate top-down views of other example arrangements of chain tethers secured to the platform 610. Particularly, FIG. 6B illustrates a top-down view of a chain tether 616 secured proximate to the center of the platform 610. The embodiment illustrated in FIG. 6C includes two chain tethers 618 and 620 oriented parallel to each other. As compared to FIGS. 6A, 6B, and 6C, the embodiment illustrated in FIG. 6D includes the chain tethers 622, 624, 626, and 628 arranged in a square configuration. This configuration may be relied upon to provide additional rigidity against undesirable sway in the platform 610. Comparing FIGS. 6C and 6D, it is noted that two additional winches are needed for the additional chain tethers in FIG. 6D. Also, it should be appreciated that, depending upon the orientation of each chain tether, an associated winch for each will typically be oriented the same way to permit spooling. Thus, for example, the winch associated with the tether 622 in FIG. 6D will be secured to a UAV in an orientation that is parallel to that for the tether 626. Similarly, the winch associated with the tether 622 in FIG. 6D will be secured to a UAV in an orientation that is perpendicular to that for the tether 624. Finally, the embodiment illustrated in FIG. 6E includes three drag chain tethers 630, 632, and 634 arranged in a triangular configuration. This configuration may also be relied upon to provide additional rigidity against undesirable sway in the platform 610, at least compared to the embodiments in FIGS. 6B and 6C, for example.

Figure 7:
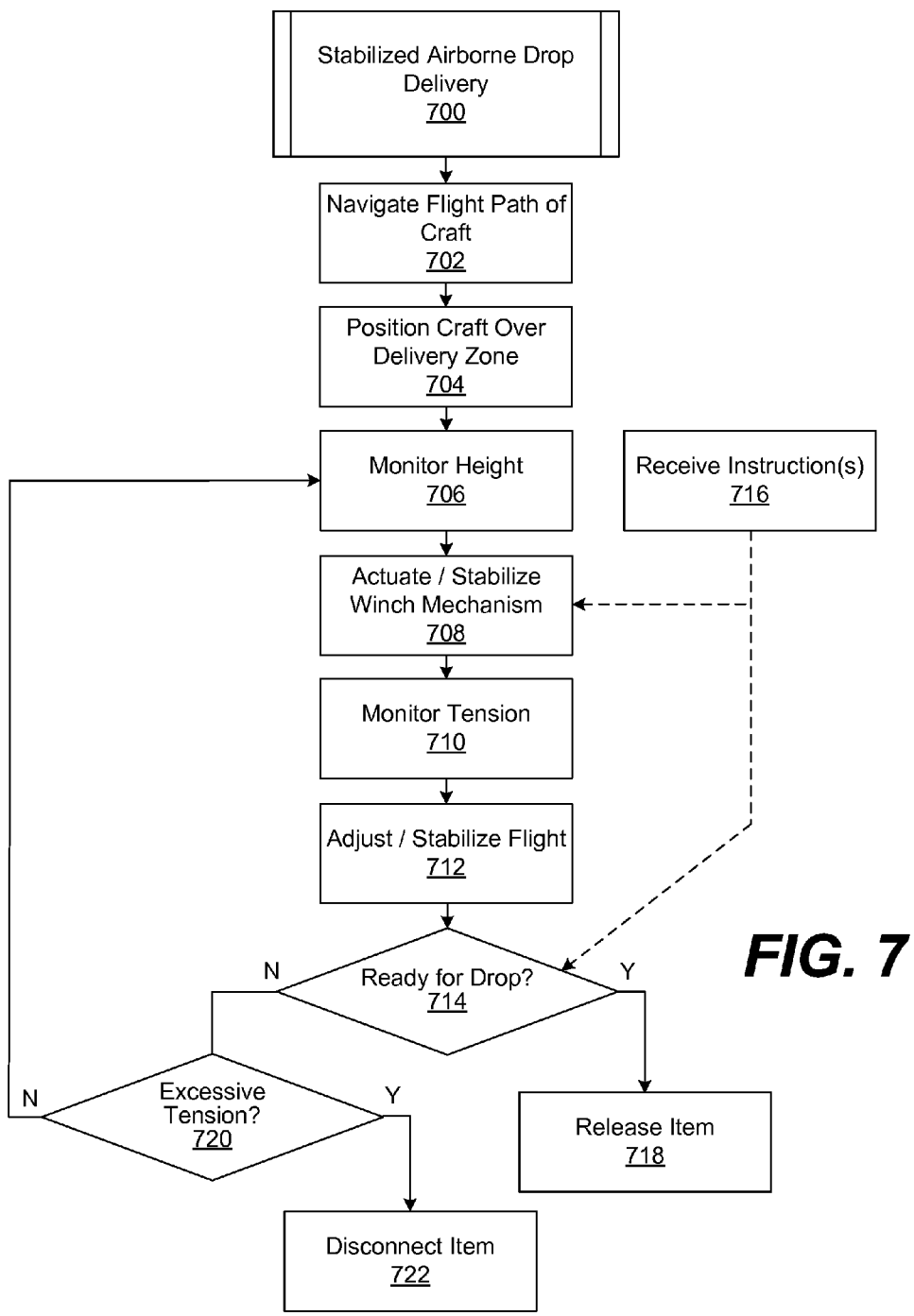
FIG. 7 illustrates a flow diagram of an example process of stabilized airborne drop delivery.

For additional details regarding the operation of the UAV 200 in FIG. 2, FIG. 7 illustrates a flow diagram of an example process 700 of stabilized airborne drop delivery that may be performed by the UAV 200. While the process 700 is described in connection with the UAV 200 and FIG. 2, it should be appreciated that the process 700 may be performed by any other UAV. It should also be noted that the flowchart in FIG. 7 provides merely one example of a process that may be employed for stabilized airborne drop delivery, as described herein.

At reference numeral 702, the process 700 includes navigating a flight path of the UAV 200 to deliver the item 290 (FIG. 2). Here, it is assumed that the UAV 200 has picked up the item 290 for delivery, and that the item 290 is secured to the platform 280 by way of the attachment mechanism 282. The flight controller 230 is configured to reference any data necessary in the flight control data 222 and/or the delivery data 224 for navigation, and control the rotor system 250 to direct the UAV 200 to a predetermined delivery zone for the item 290. The predetermined delivery zone may be identified by an address, street location, geographic coordinates, or other identifying information. While navigating, the flight control processor 232 may reference data provided by the flight sensors 238, such as GPS coordinates, image information, etc., to locate the delivery zone.

When the UAV 200 is proximate to the delivery zone, the process 700 includes positioning the UAV 200 over the delivery zone to deliver the item 290, at reference numeral 704. As one example of a delivery zone, the delivery zone 170 in FIG. 1 is representative. In various embodiments, the delivery zone may be marked with some visual marking, as the delivery zone 170 in FIG. 1 is marked with crosshairs, for example. When visually marked, the UAV 200 may rely upon an image sensor among the flight sensors 238, for example, to narrow in on the delivery zone at reference numeral 704 (e.g., using image processing).

Once the UAV 200 is suitably positioned over the delivery zone at reference numeral 704, the process 700 includes monitoring one or more of the height of the UAV 200, the platform 280, and/or the item 290, at reference numeral 706. Here, the flight controller 230 is configured to monitor one or more of these heights before (and while) lowering the platform 280 using the winch mechanism 260. The flight controller 230 may monitor these heights using a height sensor, an image sensor (e.g., using image processing), a surface contact sensor, an ultrasonic sensor, a pressure sensor, or any other sensor among the flight sensors 238.

Once the UAV 200 is positioned over the delivery zone at a suitable height, the process 700 turns to actuating and/or stabilizing the winch mechanism 260 to lower the platform 280, at reference numeral 708. More particularly, the winch controller 234 may actuate the winch mechanism 260 to lower the platform 280 by extending the tethers 262 and 264. At the same time, the process may include sensing, by the orientation sensors 276, any shift in orientation of the platform 280, and controlling, by the payload controller 274, an amount of thrust generated by one or more of the thrust generators 272 based on the sensing. In this way, the payload controller 274 may help to maintain an orientation of the platform 280 while it is being lowered.

In another aspect of the embodiments, a user may remotely control certain operations of the UAV 200 after it arrives at a delivery zone. In this context, at reference numeral 716, the process 700 may include receiving operating instructions over the communications interface 240 of the UAV 200. The instructions may be received from an individual, such as a homeowner, business owner or operator, etc., present at the delivery zone. The instructions may direct the UAV 200 to lower the platform 280 and/or release the attachment mechanism 282. Using a client device with data communications capabilities, the individual may take the opportunity to send the instructions to the UAV 200 to control the operation of the winch mechanism 260 and/or the attachment mechanism 282. For example, as the individual watches the UAV 200 position itself over the delivery zone at reference numeral 704, the individual may direct the UAV 200 to lower the winch mechanism 260 at reference numeral 708.

At reference numeral 710, the process 700 includes monitoring for tension in the tethers 262 and 264. Particularly, the tension detector 269 may monitor tension in the tethers 262 and 264 and provide a signal representative of such tension to the flight controller 230. As described in further detail below, the flight controller 230 may monitor for tension greater than a predetermined threshold or greater than that expected for the weight of the item 290, for example.

At reference numeral 712, the process 700 includes adjusting or stabilizing the UAV 200. That is, while the winch controller 234 lowers the platform 280, the flight control processor 232 is configured to maintain an orientation of the UAV 200 while the platform 280 is being lowered. Especially when drag chains are used to tether the platform 280 to the winch mechanism 260, as described herein, any sway in the platform 280 may be translated to the UAV 200. In this case, the flight control processor 232 is configured to maintain an orientation of the UAV 200. In this context, the flight sensors 238 may provide feedback regarding the orientation of the UAV 200 to the flight control processor 232. In turn, the flight control processor 232 may control the rotor system 250 to maintain the orientation of the UAV 200 based on the feedback. Additionally, to the extent that the height of the UAV 200 is determined to be too great to drop the item 290, the flight control processor 232 may continue to lower the UAV 200.

At reference numeral 714, the process 700 includes determining whether the UAV 200 is ready to drop the item 290. Here, the attachment controller 236 is configured to consider various factors before releasing the item 290 at reference numeral 718. For example, the attachment controller 236 may determine whether the height of the UAV 200, the platform 280, and/or the item 290, as monitored at reference numeral 706, is suitable for releasing the item 290. In some cases, the attachment controller 236 may determine whether the height of the UAV 200, the platform 280, and/or the item 290 is less than a predetermined height before releasing the item 290. If the height of the UAV 200 is too great, the attachment controller 236 may determine that the UAV 200 is not low enough to safely release the item 290, and the process 700 may proceed back to reference numerals 706, 708, and 710 for further height monitoring and flight adjustments.

In some cases, the attachment controller 236 may wait for the UAV 200 (or some part of the UAV 200 or the item 290) to make contact with the landing surface at the delivery zone before the process 700 proceeds to reference numeral 718 for releasing the item 290. The attachment controller 236 may also consider whether the orientation of the UAV 200 is stable enough for releasing the item 290 at reference numeral 718. The attachment controller 236 may make this determination based on feedback from the flight sensors 238.

Also, if an instruction to release the item 290 has been received at reference numeral 716, this instruction may be taken into account by the attachment controller 236 at reference numerals 714. Generally, even if an instruction to release the item 290 has been received, the process 700 will not proceed to reference numeral 718 unless the attachment controller 236 has determined that other considerations, such as suitable orientation and/or height of the UAV 200, are also met. It is also noted that the attachment controller 236 may take various combinations of considerations into account when determining whether the UAV 200 is ready to drop the item 290 at reference numeral 718. For example, the process 700 may proceed to reference numeral 718 based on whether the height of the UAV 200 is less than a predetermined drop height and an instruction to release the item 290 has been received at reference numeral 716.

Figure 8:
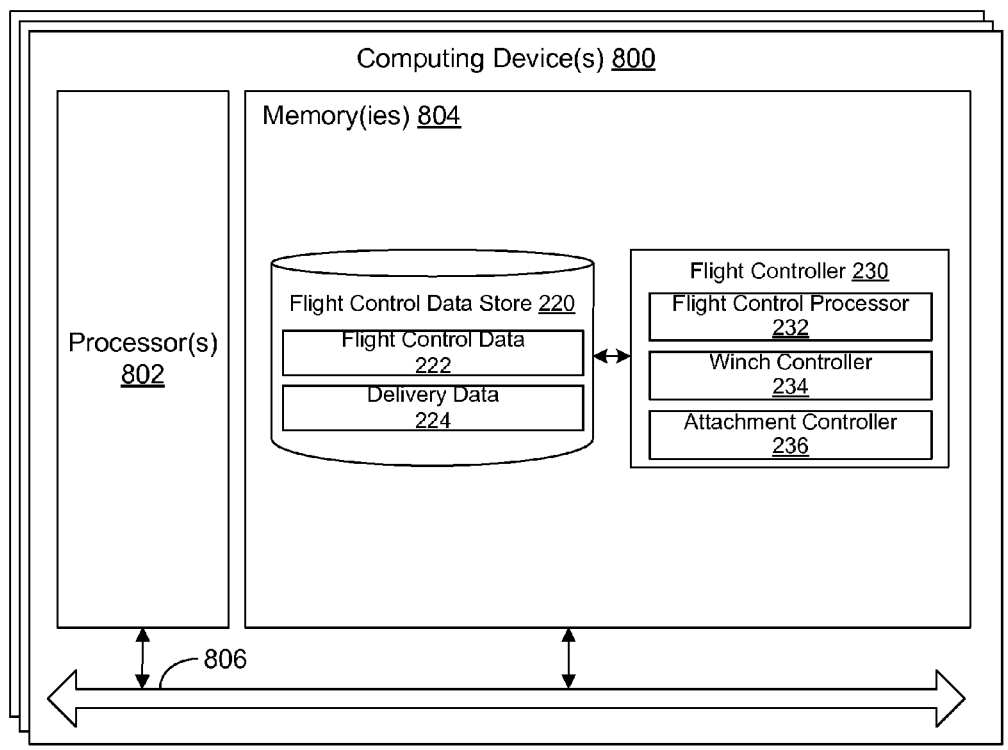
FIG. 8 illustrates an example schematic block diagram of the computing device employed in the stabilized drop delivery UAV in FIG. 2 according to various embodiments of the present disclosure.

At reference numeral 720, the process 700 includes determining whether the tension in the tethers 262 and 264 is excessive. In other words, at reference numeral 720, the process 700 includes determining whether the tension is greater than a predetermined threshold or greater than that expected for the weight of the item 290, for example. Here, the tension detector 269 may detect and provide a signal representative of tension in the tethers 262 and 264 to the flight controller 230, and the flight controller 230 may determine whether that tension is greater than a predetermined threshold. If the tension is greater than the threshold, the process 700 may proceed to reference numeral 722, for disconnecting the item 290 from the UAV 200. Particularly, the flight controller 230 may control one or both of the tension breakers 266 and 268 to disconnect. Once disconnected by the tension breakers 266 and 268, the winch mechanism 260 and/or the platform 280 may fall from the UAV 200 along with the item 290. In this sense, the tension breakers 266 and 268 offer some protection against the platform 280 being unexpectedly pulled or caught in a tree, power line, etc. FIG. 8 illustrates an example schematic block diagram of the computing device 210 employed in the stabilized drop delivery UAV 200 in FIG. 2 according to various embodiments of the present disclosure. The computing device 210 includes one or more computing devices 800. Each computing device 800 includes at least one processing circuit or system, for example, having a processor 802 and a memory 804, both of which are electrically and communicatively coupled to a local interface 806. The local interface 806 may be embodied as, for example, a data bus with an accompanying address/control bus or other bus structure as can be appreciated.

In various embodiments, the memory 804 stores data and software or executable-code components executable by the processor 802. For example, the memory 804 may store executable-code components associated with the materials handling facility operations logic 130, for execution by the processor 802. The memory 804 may also store data such as that stored in the flight control data store 220, among other data.

It should be understood and appreciated that the memory 804 may store other executable-code components for execution by the processor 802. For example, an operating system may be stored in the memory 804 for execution by the processor 802. Where any component discussed herein is implemented in the form of software, any one of a number of programming languages may be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 804 stores software for execution by the processor 802. In this respect, the terms "executable" or "for execution" refer to software forms that can ultimately be run or executed by the processor 802, whether in source, object, machine, or other form. Examples of executable programs include, for example, a compiled program that can be translated into a machine code format and loaded into a random access portion of the memory 804 and executed by the processor 802, source code that can be expressed in an object code format and loaded into a random access portion of the memory 804 and executed by the processor 802, or source code that can be interpreted by another executable program to generate instructions in a random access portion of the memory 804 and executed by the processor 802, etc. An executable program may be stored in any portion or component of the memory 804 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 804 may include both volatile and nonvolatile memory and data storage components. Volatile components are those that do not retain data values upon loss of power. Nonvolatile components are those that retain data upon a loss of power. Thus, the memory 804 may include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

Also, the processor 802 may represent multiple processors 802 and/or multiple processor cores and the memory 804 may represent multiple memories that operate in parallel, respectively, or in combination. Thus, the local interface 806 may be an appropriate network or bus that facilitates communication between any two of the multiple processors 802, between any processor 802 and any of the memories 804, or between any two of the memories 804, etc.

As discussed above, the flight controller 230 may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart or process diagram of FIG. 7 is representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 802. The machine code may be converted from the source code, etc. Further, each block may represent, or be connected with, a circuit or a number of interconnected circuits to implement a certain logical function or process step.

Although the flowchart or process diagram of FIG. 7 illustrates a specific order, it is understood that the order may differ from that which is depicted. For example, an order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the flight controller 230 that is embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIG. 7. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may include a RAM including, for example, an SRAM, DRAM, or MRAM. In addition, the computer-readable medium may include a ROM, a PROM, an EPROM, an EEPROM, or other similar memory device.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. An apparatus, comprising:
an Unmanned Aerial Vehicle (UAV), comprising:
  a flight controller configured to control a flight path of the UAV;
  a winch mechanism secured to an underside of the UAV, the winch mechanism comprising:
    a first winch including a first extendable tether, the first winch being secured to the UAV in a first orientation;
    a second winch including a second extendable tether, the second winch being secured to the UAV in a second orientation; and
    a platform tethered to a distal end of the first and second extendable tethers, the platform including an attachment mechanism to releasably secure an item to the platform; and
  a payload system configured to stabilize the platform, the payload system comprising:
    at least one thrust generator;
    at least one orientation sensor; and
    a payload controller configured to control the at least one thrust generator to alter an orientation of the platform based on feedback from the at least one orientation sensor, wherein
the first extendable tether flexes in a first direction and resists flexing in a second direction, the second extendable tether flexes in the second direction and resists flexing in the first direction, and the first direction is different than the second direction.

2. The apparatus of claim 1, wherein the flight controller is further configured to:
actuate the winch mechanism of the UAV to extend the platform from the UAV;
monitor a height of at least one of the platform or the item above a landing surface within a delivery zone; and
based on the height, release the item from the platform to deliver the item.

3. An apparatus, comprising:
an Unmanned Aerial Vehicle (UAV), comprising:
  an orientation sensor;
  a flight controller configured to control a flight path and orientation of the UAV;
  a first winch mechanism secured to the UAV in a first orientation;
  a second winch mechanism secured to the UAV in a second orientation; and
  a platform tethered to a distal end of the first winch mechanism and the second winch mechanism, the platform including an attachment mechanism to releasably secure an item to the platform, wherein
the first extendable tether flexes in a first direction and resists flexing in a second direction, the second extendable tether flexes in the second direction and resists flexing in the first direction, and the first direction is different than the second direction.

4. The apparatus of claim 3, wherein the flight controller is further configured to monitor a height of at least one of the platform or the item above a landing surface within a delivery zone.

5. The apparatus of claim 4, wherein the flight controller is further configured to actuate the attachment mechanism of the UAV to release the item based on the height.

6. The apparatus of claim 4, further comprising:
a contact sensor to detect contact with the landing surface, wherein the flight controller is further configured to release the item from the platform based on a signal from the contact sensor.

7. The apparatus of claim 4, wherein the flight controller is further configured to:
determine whether the monitored height is less than a predetermined drop height;
receive an instruction to release the item via a communications interface; and
release the item from the attachment mechanism.

8. The apparatus of claim 3, wherein the first winch includes a first extendable tether and the second winch includes a second extendable tether.

9. The apparatus of claim 8, wherein the flight controller is further configured to:
determine whether tension in at least one of the first extendable tether and the second extendable tether is greater than a predetermined threshold based on a signal from a tension sensor; and
disconnect at least one of the winch mechanism or the platform when the tension is greater than the predetermined threshold.

10. The apparatus of claim 4, further comprising a payload system configured to stabilize the platform, the payload system comprising:
at least one thrust generator;
at least one orientation sensor; and
a payload controller to control the at least one thrust generator based on feedback from the at least one orientation sensor.

11. The apparatus of claim 10, wherein the payload controller is configured to control the at least one thrust generator to provide thrust in a direction opposing a direction of tilt of the platform.

12. An Unmanned Aerial Vehicle (UAV), comprising:
a first winch including a first extendable tether secured to an underside of the UAV in a first orientation;
a second winch including a second extendable tether secured to the underside of the UAV in a second orientation;
an attachment mechanism to releasably secure an item to the first extendable tether and the second extendable tether;
an orientation sensor to provide orientation feedback signals representative of swinging or tilting in at least one of the first extendable tether, the second extendable tether, and the item; and
a flight controller configured to control flight of the UAV based on the orientation feedback signals, wherein the first extendable tether flexes in a first direction and resists flexing in a second direction, the second extendable tether flexes in the second direction and resists flexing in the first direction, and the first direction is different than the second direction.

13. The UAV of claim 12, further comprising a payload system at a distal end of the first extendable tether and the second extendable tether.

14. The UAV of claim 13, wherein the payload system comprises:
at least one thrust generator; and
a payload controller configured to control the at least one thrust generator to alter an orientation of the payload system based on the orientation feedback signals.

15. The UAV of claim 14, wherein the payload controller is further configured to:
determine a shift in orientation of the payload system based on the orientation feedback signals; and
control an amount of thrust generated by the at least one thrust generator based on the shift in orientation.

16. The UAV of claim 12, wherein the flight controller is further configured to:
actuate the first winch and the second winch to extend the first extendable tether and the second extendable tether from the UAV;
monitor a height of the item above a landing surface; and
actuate the attachment mechanism of the UAV to release the item based on the height.

17. The UAV of claim 16, wherein the flight controller is further configured to:
determine whether the height of the UAV above the landing surface is less than a predetermined drop height;
receive an instruction to release the item via a communications interface; and
release the item from the extendable tether using the attachment mechanism.

18. The apparatus of claim 1, wherein the first orientation is perpendicular to the second orientation.

19. The apparatus of claim 3, wherein the first orientation is perpendicular to the second orientation.

20. The UAV of claim 12, wherein the first orientation is perpendicular to the second orientation.

* * * * *

UNITED STATES PATENT AND TRADEMARK OFFICE
CERTIFICATE OF CORRECTION

PATENT NO. : 9,688,404 B1
APPLICATION NO. : 14/558046
DATED : June 27, 2017
INVENTOR(S) : Buchmueller et al.

Page 1 of 1

It is certified that error appears in the above-identified patent and that said Letters Patent is hereby corrected as shown below:

At Column 16, Lines 5-7, in Claim 3, delete:
"the first extendable tether flexes in a first direction and resists flexing in a second direction, the second extendable tether flexes in the second direction and resists", And replace with:
--a first extendable tether flexes in a first direction and resists flexing in a second direction, a second extendable tether flexes in the second direction and resists--

AND

At Column 18, Line 9, in Claim 17, delete:
"determine whether the height of the UAV above the", And replace with:
--determine whether the height of the item above the--

Signed and Sealed this
Twentieth Day of February, 2018

Andrei Iancu
*Director of the United States Patent and Trademark Office*